May 27, 1969  S. A. PLATT  3,446,551
CONTINUOUS FILMSTRIP APPARATUS
Filed March 10, 1966  Sheet 1 of 3

INVENTOR.
STEPHEN A. PLATT
BY
ATTORNEYS

May 27, 1969     S. A. PLATT     3,446,551
CONTINUOUS FILMSTRIP APPARATUS
Filed March 10, 1966     Sheet 2 of 3

INVENTOR.
STEPHEN A. PLATT
BY
ATTORNEYS

INVENTOR.
STEPHEN A. PLATT
BY
ATTORNEYS

United States Patent Office 3,446,551
Patented May 27, 1969

3,446,551
CONTINUOUS FILMSTRIP APPARATUS
Stephen A. Platt, 1100 Fulton St.,
Grand Haven, Mich. 49417
Filed Mar. 10, 1966, Ser. No. 533,303
Int. Cl. G03b 21/06
U.S. Cl. 353—21                                8 Claims

ABSTRACT OF THE DISCLOSURE

A freestanding filmstrip cartridge assembly allowing unhindered advancement by having two tracks, each circular in configuration, at an acute angle to each other, one containing a multiple turn circular filmstrip loop and the other a diverging but still circular single filmstrip loop, both tracks having free space radially inwardly of the loops to cause both loops to retain freestanding circular condition. An optical viewing device straddles the single turn loop, with one element thereof projecting into the free space within the loops.

---

This invention relates to equipment for handling freestanding filmstrip, and more particularly to a special viewing and/or projecting apparatus for a multi-turn, circular, continuous filmstrip loop.

The term "filmstrip" is used in the trade to designate a strip of interconnected photographic slides to be viewed one at a time. It differs from conventional 8 millimeter or 16 millimeter motion picture film in being 2 to 4 times as wide and having a relatively short length measured in inches rather than feet. Motion picture film can easily be employed in closed loop form in a loop several inches in diameter, if it is sustained and positioned by an inner generally circular loosely fitting form. Since it is in the form of a closed loop, the innermost turn is always connected to the outermost turn. It is projected by continuously pulling away from the loop and taking beyond the circle of the endless roll, the portions of the film connecting the inner and outer convolutions. It is pulled into an ovular or other non-circular configuration therefore. The film is advanced by driving the ovular or other segment. Although supported, narrow, lengthy, motion picture film can be readily handled by this technique, filmstrip cannot. It has been found that filmstrip does not lend itself to being distorted beyond its circle. More specifically it has been determined that, wih a continuous loop of several turns of filmstrip only a few inches in diameter and of substantial width, pulling one turn continuously out of the circle by extending it into an ovular or other form creates tremendous friction problems between the filmstrip turns with attempted advancement of the filmstrip. Disortion of the entire circle of the multiturn loop actually occurs if the loop is freestanding, i.e. without inner support.

The diverging angle which the film or filmstrip makes in departing and returning to a multi-turn loop is a direct function of its width and becomes a critical factor with the filmstrip loop only a few inches in diameter. Moreover, the multiple turns of the filmstrip must absorb angulation without the induced friction stopping the loop flow action. These factors present a substantial problem with wide, short length filmstrip. Therefore, what is really needed for handling the filmstrip is a method and apparatus for keeping this diverging angle and the resulting friction near nil, i.e. at a minimum. This can be done by keeping all turns of the multi-turn loop in a circle, including even the portion inter-connecting the innermost and outermost turns. It has been determined that this would be the solution to the problem of handling filmstrip in continuous loop form.

Because of these practical problems in handling of continuous loop filmstrip, filmstrip has not been used in continuous loop form. Yet, it would be extremely desirable to do so that a small viewing or projecting cartridge could be conveniently used for such purposes as advertising, education, and/or entertainment.

It is an object of this invention to provide a simple, unique inexpensive filmstrip viewer and/or projector enabling a small continuous loop of short wide filmstrip to be viewed or projected, while all of the turns of the loop are kept freestanding i.e. without inner support. Moreover, all of the turns are in circular form, even the connecting portion between the innermost and outermost turns of the loop. The filmstrip can be advanced without any significant friction between the turns of the multiple loop, or any distortion.

Another object of this invention is to provide a filmstrip viewer and/or projector capable of containing and displaying a continuous multiple turn loop of filmstrip as a freestanding loop within an inside diameter down to only about twice the film width, i.e. about 2¾ inches for 35 millimeter filmstrip, and to do so such that the small diameter, free form of the wide filmstrip has a stable, freely moving characteristic, yet without inside support.

Another object of this invention is to provide a compact filmstrip viewer and/or projector capable of retaining an entire continuous multiple turn filmstrip in a small loop about 2 to 3 inches in diameter, enabling simple and easy loading, and simple advancement of individual frames of the loop for viewing. The film loop can be of varied number of turns, of varied length, and of varied diameter. It moreover can be advanced in either direction at any time or stopped for any period of time.

Another object of this invention is to provide an optical viewer and/or projector for a continuous multiple turn loop of filmstrip, having optical viewing means or light projection means actually located in the space within the freestanding circular loop. The unit can therefore be in a very compact form, enabling all turns of the multiple loop to be retained in circular configuration, without film distortion, and with free frictionless advancement at any selected rate. Moreover, one freestanding filmstrip loop can be exchanged for another quickly and easily. Further, the structure can be oriented in the horizontal or vertical direction with equal viewing facility. It may be employed as a desk top teaching or educational device, or as a projecting means of simple, reliable, compact construction. Furthermore, both the projecting and the direct viewing features can be obtained with the same simple reliable cartridge.

Another object of this invention is to provide a method of handling and advancing filmstrip in a relatively frictionless manner, while in freestanding form, without inner support, and without distortion of any of the filmstrip from a circular configuration.

These and other objects of this invention will become apparent upon studying the following specification in conjunction with the drawings in which.

Figure 1:
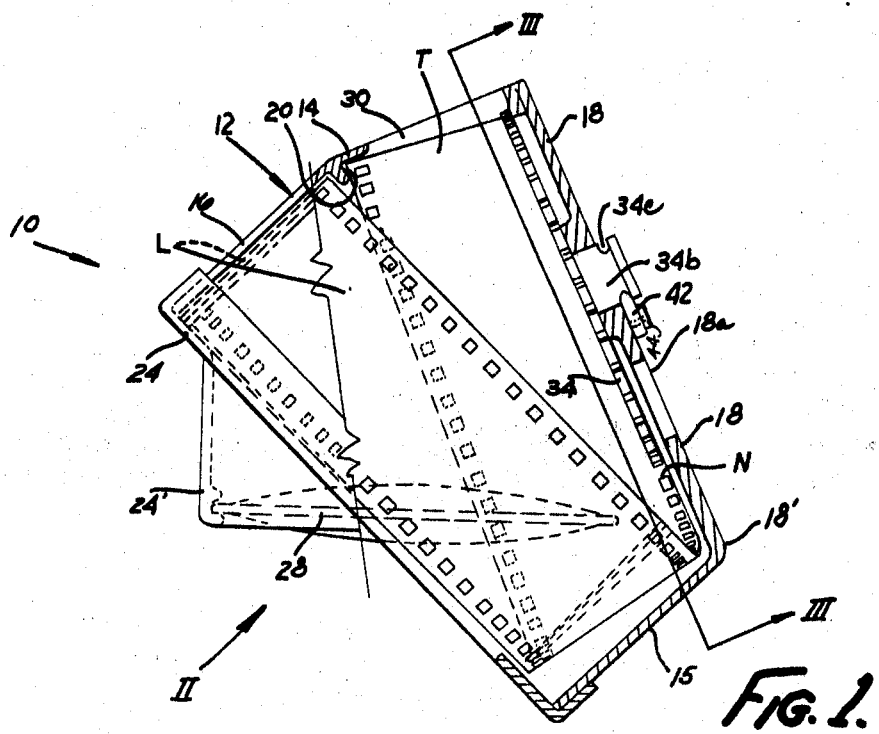
FIG. 1 is a side elevational partially sectioned view of the first form of the apparatus.
Figure 2:
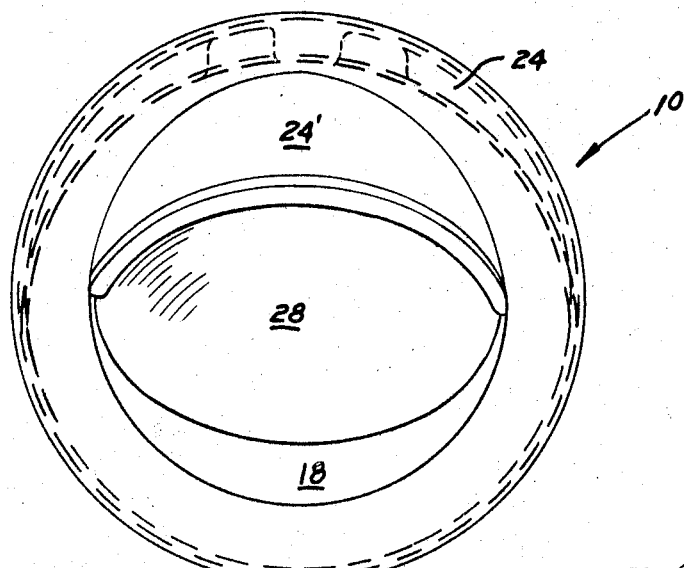
FIG. 2 is a view of the apparatus in FIG. 1, taken in the direction indicated by the arrow II in FIG. 1.
Figure 3:
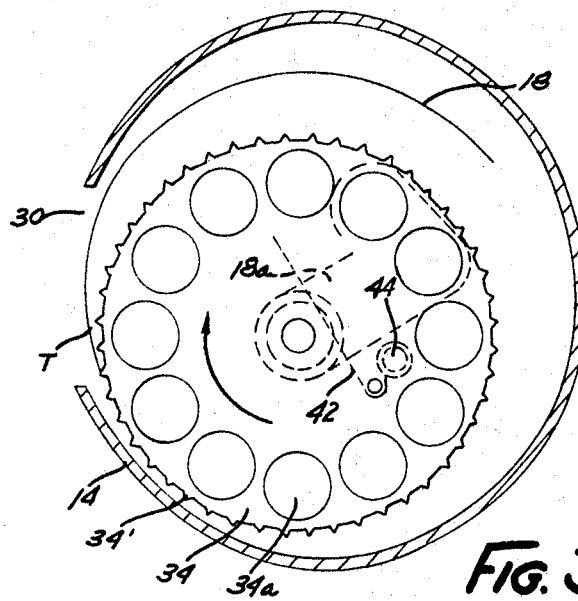
FIG. 3 is a sectional view taken on plane III–III of FIG. 1.

Referring now specifically to the drawings, the cartridge assembly 10 in the first form of the apparatus shown in FIGS. 1 through 3 basically includes a hollow generally circular support housing 12 formed of a circular lower portion 14, and a circular upper portion 16 having the same diameter as lower portion 14, and integral therewith, but diverging therefrom at a small acute angle. Housing portions 14 and 16 have axially adjacent wall portions on one side of the housing, with these annular wall portions merging together to a common wall portion 15 on the opposite side of the housing.

One of the housing portions, specifically upper portion 16 in this illustrated form of the device, comprises a receiving and retaining means for the multiple turn, freestanding filmstrip loop L. The loop is basically supported on one side by edge 18′ of end wall 18, and a small dividing ledge 20 projecting inwardly portions 14 and 16 opposite edge 18′. On its opposite (upper) side, the loop is retained by an annular peripheral cover 24 which closes the open upper side of the housing. Actually, if this structure is inverted, the cover then supports the filmstrip.

In this form of the device, the cover, and more specifically an integral projection 24′ supports and mounts a direct viewing magnifying lens 28 which extends within the free space within the multiple turn loop L and single loop T. The central area of cover 24 adjacent lens 28 is cut out to enable direct viewing through the lens in the direction indicated by the arrow in FIG. 1. The lens is aligned with an opening 30 in the outer diameter of portion 14 of housing 12, and aligned with the adjacent single turn portion T that interconnects the innermost and outermost turns of the filmstrip loop L. Continued advancement of the loop in either direction causes progressive portions of the multiple turn loop to take the place of circular turn T divergent axially from the remaining circular turns, beneath ledge 20 and adjacent surface 18 for direct viewing.

It is significant to this invention that the multiple turn filmstrip is not supported by any inner means in the housing. It is freestanding, self-supporting, and completely circular in configuration, both in the single turn T that departs momentarily from the multiple turn loop, and in the remaining turns of the loop. Hence, advancement of the film by rotation of the filmstrip can be very easily and smoothly accomplished without any distortion and practically no friction. In fact, due to the free-standing frictionless nature of the filmstrip in this housing, the entire loop can be advanced smoothly by advancing the single turn T. This may be achieved for example with the sprocket or telephone dial type equipment shown. More specifically, mounted inside the housing, adjacent base end 18, is a circular dial 34 having spaced radial teeth 34′ on its outer periphery, to engage the notches in the filmstrip, particularly in turn T of the filmstrip. Similar to a telephone dial, this disc 34 has finger-receiving openings 34a at spaced intervals around its periphery, which are accessible through an elongated finger-receiving opening 18a in surface 18. This opening may be L-shaped in configuration as shown in FIG. 3, for easy mounting of the disc. The disc includes a central axle 34b which extends down through a bearing opening in the housing end 18. A retainer spring 42, attached to end 18 by pin 44, engages annular groove 34c in axle 34b. By shifting spring 42 against its bias, axle 34b of the dial can be released to be inserted or removed from engagement with the housing portion.

As briefly noted previously, the novel construction enables the filmstrip to be worked as a free-standing continuous loop without inner support, always maintaining a circular configuration, to give a free flow advancing action in loops of inside diameter down to twice the film width. With this construction, advantage is taken of the filmstrips stable free flowing, freestanding characteristics, worked in its natural circular configuration, to wrap the turns of the loop around the viewing magnifier which is actually located in the space within the loop. The magnifier may be an integral part of the molded cartridge, in the preferred form of the device, for example by mounting it integrally with cover 24. The unit is extremely handy to use, as well as compact, without requiring complex mechanism such as linkages, shifters, etc. to operate upon the filmstrip loop. The drive system or advancing means for the filmstrip actually occupies some of the space within the continuous loop, as does at least a portion of the optics.

In operation of this form of the device therefore, the continuous filmstrip multiple turn loop is inserted merely by removing cover 24 with magnifying lens 28, inserting a free-standing, self-supporting circular filmstrip loop, placing the interconnecting turn T between the outermost turn and innermost turn of the loop beneath ledge 20, and the remaining turns on ledge 20. With replacement of cover 24, lens 28 is inserted directly into the space within the loop, aligned with outlet opening 30 and adjacent filmstrip portion thereto. The dial advancer 34 is engaged with the loop by sliding it into the position shown in FIGS. 1 and 3, and engaging biasing spring 42 therewith to retain teeth 34′ in engagement with the filmstrip notches of turn T adjacent opening 30. Then, by inserting one's finger through opening 18a, and shifting it arcuately, successive frames of the filmstrip are advanced between lens 28 and opening 30 for direct viewing. All but one turn of the loop is therefore on a first annular support track means having outer peripheral loop retaining means, with the one turn T being on a second annular support track means having outer peripheral retaining means, and merging with the first. The first track means has its diametral planes at an acute angle to the diametral planes of the second track means. The optical viewing means, astraddle the second track means and turn T, includes optical lens means and means of increasing light intensity on the singulated filmstrip portions viewed. The optical viewing means here is direct viewing means but can include projection viewing means as explained hereinafter. The means of increasing light intensity is here merely an opening to external light to form light inlet means, but can include or comprise a light source too, as explained hereinafter.

*Second form*

Figure 4:
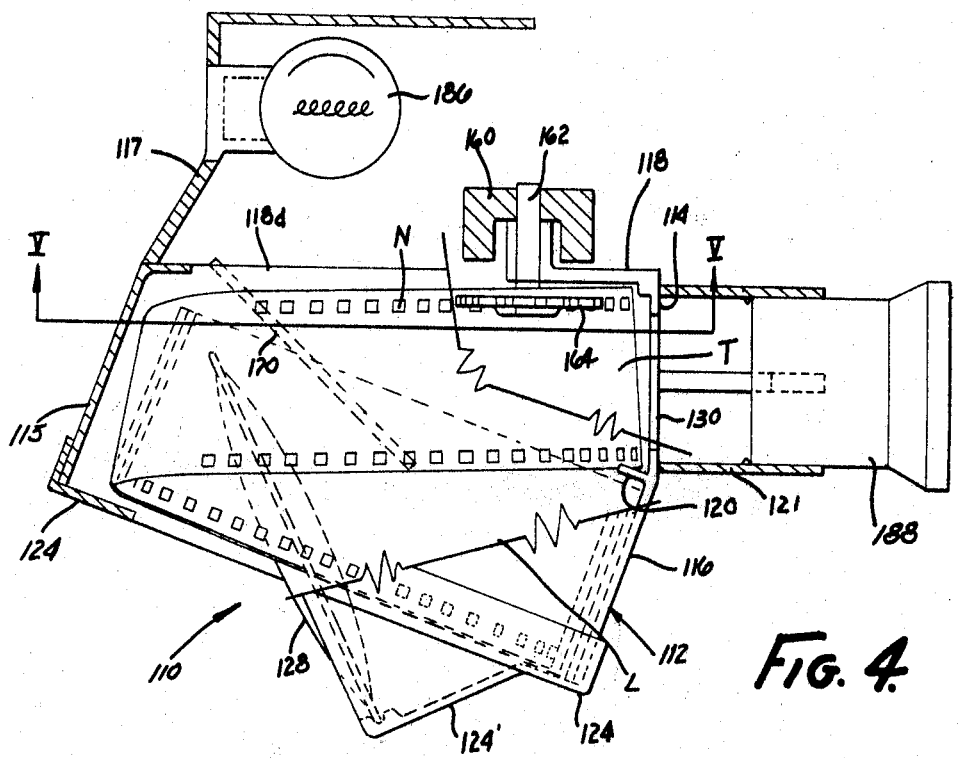
FIG. 4 is a side elevational view of a second form of the novel apparatus.
Figure 5:
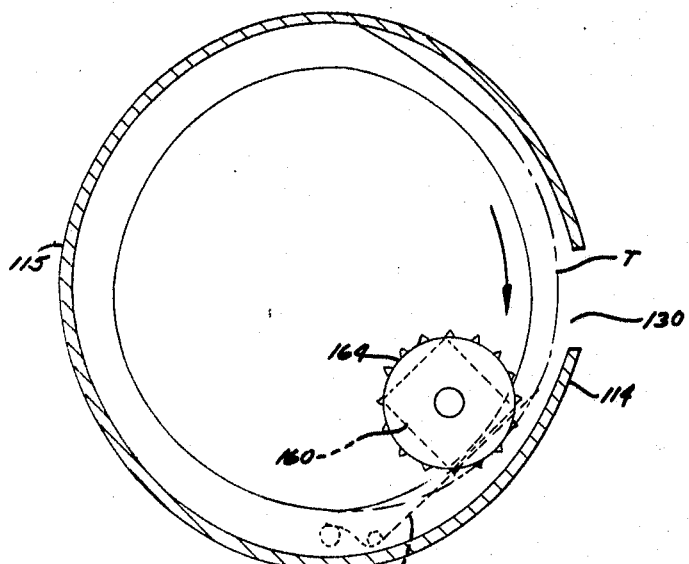
FIG. 5 is a sectional view taken on plane V—V of FIG. 4.

Instead of having only a direct viewing assembly as in FIGS. 1 through 3, employing the magnifying lens, it may be desirable to have the novel cartridge employed in the manner to project the image onto a screen. In fact, both direct viewing and screen projection can be incorporated in the same assembly, as shown in FIGS. 4 and 5.

In this modified form of assembly 110, housing 112 is practically the same as before, including adjacent housing portions 116 and 114 separated by ledge 120, integrally associated and converging at common wall 115 opposite aperture 130. Cover 124 includes a portion 124′ supporting the direct viewing magnifying optical lens 128 which projects, with placement of the cover on the assembly, down into the space within the multiple turn filmstrip loop L, aligned with housing opening 130 and a portion of single turn T of the filmstrip. This single turn, as previously, is kept in a circular form like the rest of loop L, but separated axially somewhat therefrom by traveling beneath ledge 120 and surface 118.

The manual advancing means in this instance is slightly modified, including a knob 160 mounted on a rotational pin 162 to which a smaller sprocket 164 is attached. This sprocket located inside the housing adjacent base 118, and adjacent opening 130, engages the notches in turn T of the multiple turn filmstrip loop. An adjacent portion of the surface or base 118 is cutaway to form a second lower opening 118d. Advancement of each individual frame of turn T of the filmstrip to align individual frame may be regulated for example by having a mounted leaf spring 190 engaging progressive sides of the square knob 160.

Within the confines of the multiple turn film loop, and inside the housing is a mirror 170 which is positioned diagonally with respect to opening 118d and opening 130. This mirror is a projection lamp mirror, being generally on a 45° angle to an exterior axially positioned light source 186. A projection lens assembly 188 is aligned with opening 130 exterior of the housing. Hence, the light imposed on mirror 170 by lamp 186 is reflected through the frame of turn T in front of opening 130, and through projection lens 188 for projection on a suitable screen or other surface (not shown). Thus, in this instance, portions of the optical viewing means located within the space within the freestanding circular multi-turn filmstrip loop includes both projecting mirror 170 and direct viewing optical lens 128. This enables a completely compact versatile assembly to be formed. Lens assembly 188 may be mounted to the housing by suitable projection supports 121. Lamp means 186 may be mounted on suitable housing projection portions 117.

The operation of this assembly is basically similar to that described with respect to the first form of the invention, except that the device may be used as a direct viewing unit, or as a projection unit, or both. Yet, the complete assembly is compact, convenient and easy to use, and enables self-supporting, freestanding filmstrip loops of only a few inches in diameter to be readily employed for a multiple of purposes.

*Third form*

Figure 6:
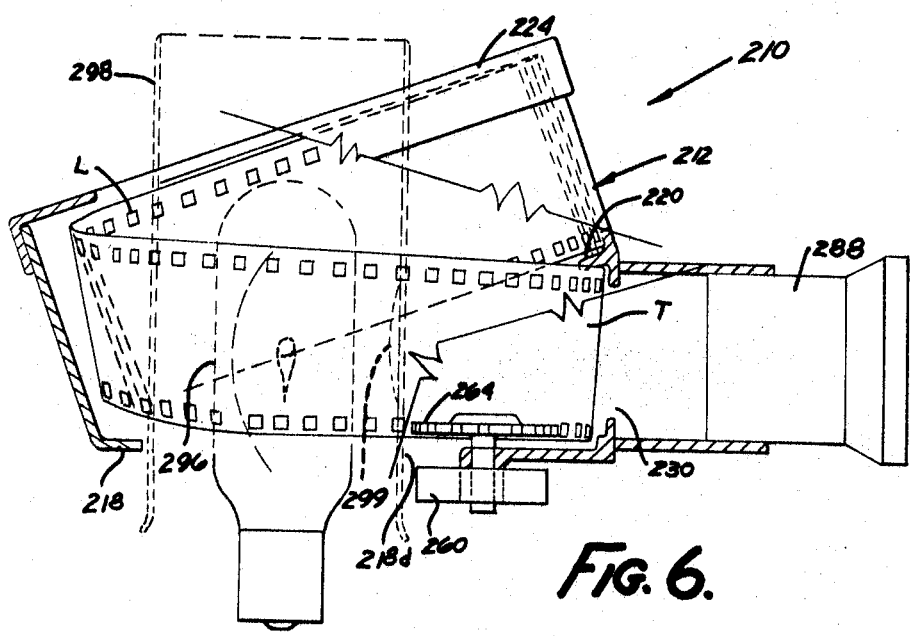
FIG. 6 is a side elevational view of the third form of the novel apparatus.

As an alternative to the direct viewing device in FIGS. 1 through 3 where the lens extends within the space in the loop, or to the combination direct viewing projecting device shown in FIGS. 4 and 5 where the lens and a projecting mirror both extend within the space within the loop, the novel apparatus may be employed only as a projection type device with the freestanding, self-supporting film loop as shown in FIG. 6. This modified form of assembly, 210, basically includes the same type housing 212 having enclosure means for the multiple turn film loop L having all but one turn supported in circular form in the upper track portion of the housing on ledge 220 and above surface 218, and retained by cover 224. The single circular turn T, momentarily and progressively separated from the multiple turns, generally in an axial direction, and aligned with opening 230, is advanced by a sprocket 264 with a square knob 260 which may be manually or mechanically advanced 90° at a time. In this instance however, the actual light source 296 for the projection system projects into the space within the multiple turn loop. This light source may be mounted within an enclosure housing 298, having an opening 299 aligned with opening 230 in the housing, and thus aligned with the projection lens assembly 228.

Basically the operation of this third form of the device is similar to those previously described. In fact, the housing structure shown in FIG. 6 may be practically identical to that shown in FIG. 4, except that the mirror and lens are removed, and the light projection light source is inserted directly through opening 218d for alignment with outlet 230 and projection lens unit 288. The filmstrip is advanced one frame at a time, having practically no frictional resistance because of its freestanding circular configuration both in the several turns of the loop which are concentric, and with the single turn T that is spaced sufficient to expose the singulated frames to the projection lens.

It is conceivable that certain minor details of construction could also be modified further within the concepts presented. Hence, it is intended that the invention should be limited only by the scope of the appended claims, and the reasonably equivalent structures to those defined therein.

I claim:
1. Continuous loop filmstrip, optical viewing apparatus comprising: a filmstrip cartridge housing having first circular support track means and outer peripheral loop retaining means for supporting and retaining all but one turn of a multiple turn, freestanding loop of filmstrip in a circular configuration; said housing also having a second circular support track means and outer peripheral retaining means for supporting and retaining said one turn of filmstrip in a circular configuration; said housing having free space radially inside said first and second circular support track means of a nature to cause both the filmstrip multiple turn loop and one turn loop to be freestanding; said second circular support track means being divergent from said first circular support track means and having diametral planes at an acute angle to the diametral planes of said first support track means to cause progressive portions of the filmstrip loop to be singulated in said one turn with maintained circular advancement of said filmstrip in said housing; optical viewing means astraddle said second support track means to be astraddle of the singulated filmstrip portions in said one turn; said optical viewing means including optical lens means and means of increasing light intensity on the singulated filmstrip portions, and one of said last mentioned means protruding into said free space; and means enabling circular advancement of said filmstrip around said cartridge housing.

2. The filmstrip, optical viewing apparatus in claim 1 wherein said optical lens means comprises a direct viewing magnifying lens protruding into said free space and exposed for direct viewing.

3. The apparatus in claim 2 wherein said means of increasing light intensity is light inlet opening means in said housing opposite said magnifying lens.

4. The apparatus in claim 1 wherein: said optical lens means includes a magnifying lens protruding into said free space and exposed for direct viewing, said housing includes a light inlet opening opposite said magnifying lens to serve as said means of increasing light intensity, said optical lens means also includes projection lens means adjacent said opening; and said apparatus includes light reflecting mirror means also protruding into said free space and includes light source means, said mirror means, light source means, opening and projection lens means being arranged to project filmstrip images that are on said singulated filmstrip portions as well as said apparatus allowing direct magnified viewing of said filmstrip portions.

5. The apparatus in claim 1 wherein said means of increasing light intensity includes a light source protruding into said free space; and said optical lens means includes projection lens means on the opposite side of said second support track means from said light source to project filmstrip images that are on said singulated filmstrip portions.

6. The apparatus in claim 1 wherein said means enabling filmstrip advancement comprises a rotational sprocket in said housing engageable with progressive filmstrip portions.

7. The apparatus in claim 6 wherein said sprocket has a plurality of arcuately spaced, finger receiving opening for dial type rotation thereof, and said housing includes opening means enabling finger insertion and arcuate advancement of said sprocket.

8. The apparatus in claim 6 wherein said sprocket is adjacent said second support track means, and positioned to engage said singulated filmstrip portions.

References Cited

UNITED STATES PATENTS

| | | | |
|---|---|---|---|
| 2,725,787 | 12/1955 | Jones | 88—28 |
| 3,206,757 | 9/1965 | Schrader | 352—72 |
| 3,278,252 | 10/1966 | Wagner et al. | 352—72 |

FOREIGN PATENTS 1,359,359  3/1964  France.

NORTON ANSHER, *Primary Examiner.*

RICHARD M. SHEER, *Assistant Examiner.*

U.S. Cl. X.R.

352—72; 353—120